(12) United States Patent
Rankin

(10) Patent No.: US 10,725,743 B2
(45) Date of Patent: Jul. 28, 2020

(54) SYSTEM AND METHOD FOR GENERATING RANDOM NUMBERS

(71) Applicant: John Rankin, Morgantown, WV (US)

(72) Inventor: John Rankin, Morgantown, WV (US)

( * ) Notice: Subject to any disclaimer, the term of this patent is extended or adjusted under 35 U.S.C. 154(b) by 12 days.

(21) Appl. No.: 16/253,062

(22) Filed: Jan. 21, 2019

(65) Prior Publication Data

US 2019/0227772 A1 Jul. 25, 2019

Related U.S. Application Data

(60) Provisional application No. 62/619,980, filed on Jan. 22, 2018.

(51) Int. Cl.
| | |
|---|---|
| *G06F 7/58* | (2006.01) |
| *H04L 12/26* | (2006.01) |
| *G06F 7/48* | (2006.01) |
| *H04L 29/06* | (2006.01) |

(52) U.S. Cl.
CPC ............ *G06F 7/582* (2013.01); *G06F 7/4824* (2013.01); *G06F 7/588* (2013.01); *H04L 43/0852* (2013.01); *H04L 43/0864* (2013.01); *H04L 63/00* (2013.01)

(58) Field of Classification Search
CPC .............................................. G06F 7/58–588
USPC ................................................. 708/250–256
See application file for complete search history.

(56) References Cited

U.S. PATENT DOCUMENTS

| | | |
|---|---|---|
| 3,688,090 A | 8/1972 | Rankin |
| 5,727,062 A | 3/1998 | Ritter |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 8,374,091 B2 | 2/2013 | Chiang |
| 8,397,151 B2 | 3/2013 | Salgado et al. |
| 9,350,663 B2 | 5/2016 | Rankin |
| 2001/0017844 A1 | 8/2001 | Mangin |
| 2001/0019614 A1 | 9/2001 | Madoukh |
| 2002/0041592 A1 | 4/2002 | Van Der Zee et al. |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Matthew D Sandifer
(74) *Attorney, Agent, or Firm* — Standley Law Group LLP; Jeffrey S. Standley; Adam J. Smith

(57) ABSTRACT

A system and method for generating a random number from an IP network is provided. A first datagram is transmitted from a first system to a second system and back to the first system. A second datagram is transmitted from the first system to the second system and back to the first system. The time elapsed between transmission of the first datagram to the second system and receipt of the first datagram back at the first system is measured as a first elapsed time. The time elapsed between transmission of the second datagram to the second system and receipt of the second datagram back at the first system is measured as a second elapsed time. The difference between the first elapsed time and the second elapsed time provides a random value.

19 Claims, 4 Drawing Sheets

(56) References Cited

U.S. PATENT DOCUMENTS

| | | |
|---|---|---|
| 2002/0054570 A1 | 5/2002 | Takeda |
| 2002/0071436 A1 | 6/2002 | Border et al. |
| 2003/0031198 A1 | 2/2003 | Currivan et al. |
| 2005/0265126 A1* | 12/2005 | Izawa .................. G06F 7/58 368/10 |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0259587 A1 | 11/2006 | Ackerman et al. |
| 2007/0028121 A1 | 2/2007 | Hsieh |
| 2007/0223395 A1 | 9/2007 | Lee et al. |
| 2010/0002868 A1 | 1/2010 | Willoughby |
| 2010/0103830 A1 | 4/2010 | Salgado et al. |
| 2011/0149891 A1 | 6/2011 | Ramakrishna |
| 2011/0231564 A1 | 9/2011 | Korsunsky et al. |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2013/0094650 A1 | 4/2013 | Mendel |
| 2013/0343377 A1 | 12/2013 | Stroud et al. |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0229714 A1 | 8/2015 | Venkatsubra et al. |
| 2016/0269294 A1 | 9/2016 | Rankin |
| 2017/0090872 A1 | 3/2017 | Mathew et al. |
| 2017/0244560 A1* | 8/2017 | Brandstatter .......... G06F 7/588 |
| 2017/0279603 A1 | 9/2017 | Chen et al. |
| 2018/0018147 A1 | 1/2018 | Sugawara |
| 2018/0102975 A1 | 4/2018 | Rankin |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

Arkin, O., ICMP Usage in Scanning, The Complete Know-How, Jun. 2001.

\* cited by examiner

SYSTEM AND METHOD FOR GENERATING RANDOM NUMBERS

CROSS-REFERENCE TO RELATED APPLICATIONS

This application claims the benefit of U.S. Provisional Application Ser. No. 62/619,980 filed Jan. 22, 2018, the disclosure of which is hereby incorporated by reference as if fully restated herein.

TECHNICAL FIELD

Exemplary embodiments of the present invention relate to a system and method of deriving a random number using natural variations in transmissions of data over a network.

BACKGROUND AND BRIEF SUMMARY OF THE INVENTION

Cryptography is fundamentally based upon the idea that modifying information in a random or pseudo-random fashion is difficult, if not impossible, to decipher without knowledge of the random pattern used for the modification. Thus, modern systems of encryption generally use a formula to generate pseudo-random numbers which are used when modifying the underlying information. The generated pseudo-random numbers can be reproduced using a seed or key as input to the formula. In most cases, this type of system can only be defeated with massive computing power. This stands in contrast to the virtual total security that truly random numbers provide. Therefore, the ability to generate a truly random number is central to a system of encryption that is virtually impregnable to a massive computing attack.

Random Block Security

Random Block Security (RBS) is a system of encryption where a block of random numbers is used to perform encryption by providing a block that is equivalent in size to the data for encryption. Since each byte of data is modified randomly, the resulting cypher is entirely secure and cannot be decrypted by any method. This form of encryption was traditionally referred to as "the one-time pad," and was often used in espionage for highly sensitive encryptions. RBS, however, may require massive amounts of data to encrypt even small amounts of underlying information, and therefore, RBS is not practical for many applications. RBS remains valuable for the delivery of smaller bursts of information of a highly sensitive and covert nature.

Random Numbers

The productions of truly random numbers is not as simple as it might initially seem, as it requires the isolation of a truly random event. While events may often initially appear to be random, they are usually influenced by biasing forces that create discernable patterns within the resulting observations. For example, the rolling of dice may be highly influenced by the uneven weight of the manufacture of the dice blocks themselves, not to mention the hand movement and orientation of release. Viewing these biases as a whole creates an observable, and thus predictable, pattern over a large number of observations.

One attempt at creating a true random number is described in U.S. Pat. No. 3,688,090 granted Aug. 29, 1972 to Bayard Rankin (hereinafter the "'090 patent"). The '090 patent describes a method of producing a random number through isolation of unpredictable events relating to human patterns of physical movement. By designing a device that required a human operator, it was possible to divide the results of the operation between machine operation and random human error operation. The isolated human error is augmented by feeding the result into subsequent operations that result in additional random human errors. After a sufficient number of errors have been compounded, the resulting value is a discrete and observable number that is truly random. However, this method is severely limited in that it requires human interaction. Since the '090 patent issued in 1972, significant strides have been made in the development of technology such that the need for stronger encryption methods is greater now than ever.

IP Networking

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

TCP can be used to establish a bi-directional connection between two clients wherein activity begins with a request for information made by one client to another client. A "client" may be any program or application that initiates requests for or sends information from one remote location to another. As used herein, the term "client" may refer to such applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

TCP software accepts requests and data streams directly from clients and other daemons, sequentially numbering the bytes, or octets, in the stream during the time the connection is active. When required, it breaks the data stream into smaller pieces called segments (sometimes referred to as datagrams or packets generally) for transmission to a requesting client. The protocol calls for the use of checksums, sequence numbers, timestamps, time-out counters and retransmission algorithms to ensure reliable data transmission. [RFC 793, 1981]

The IP layer actually performs the communication function between two networked hosts. The IP software receives data segments from the TCP layer, ensures that the segment is sized properly to meet the requirements of the transmission path and physical adapters (such as Ethernets and CTCs). IP changes the segment size if necessary by breaking it down into smaller IP datagrams, and transmits the data to the physical network interface or layer of the host. [RFC 791, 1981]

What is needed in the art is a better way to create random numbers without the use of human operation. The present invention is a system and method for creating random numbers without the use of human operation.

In exemplary embodiments, random numbers are generated by measuring transmission turn-around time, or other unpredictable network events, within an IP network. A truly random number may be derived by isolating the difference between the expected network behavior and that which is due to random error. The propagators of random behavior may be, for example without limitation, electrical interference, network congestion, and other such unpredictable network interactions.

Further features and advantages of the systems and methods disclosed herein, as well as the structure and operation of various aspects of the present disclosure, are described in detail below with reference to the accompanying figures.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
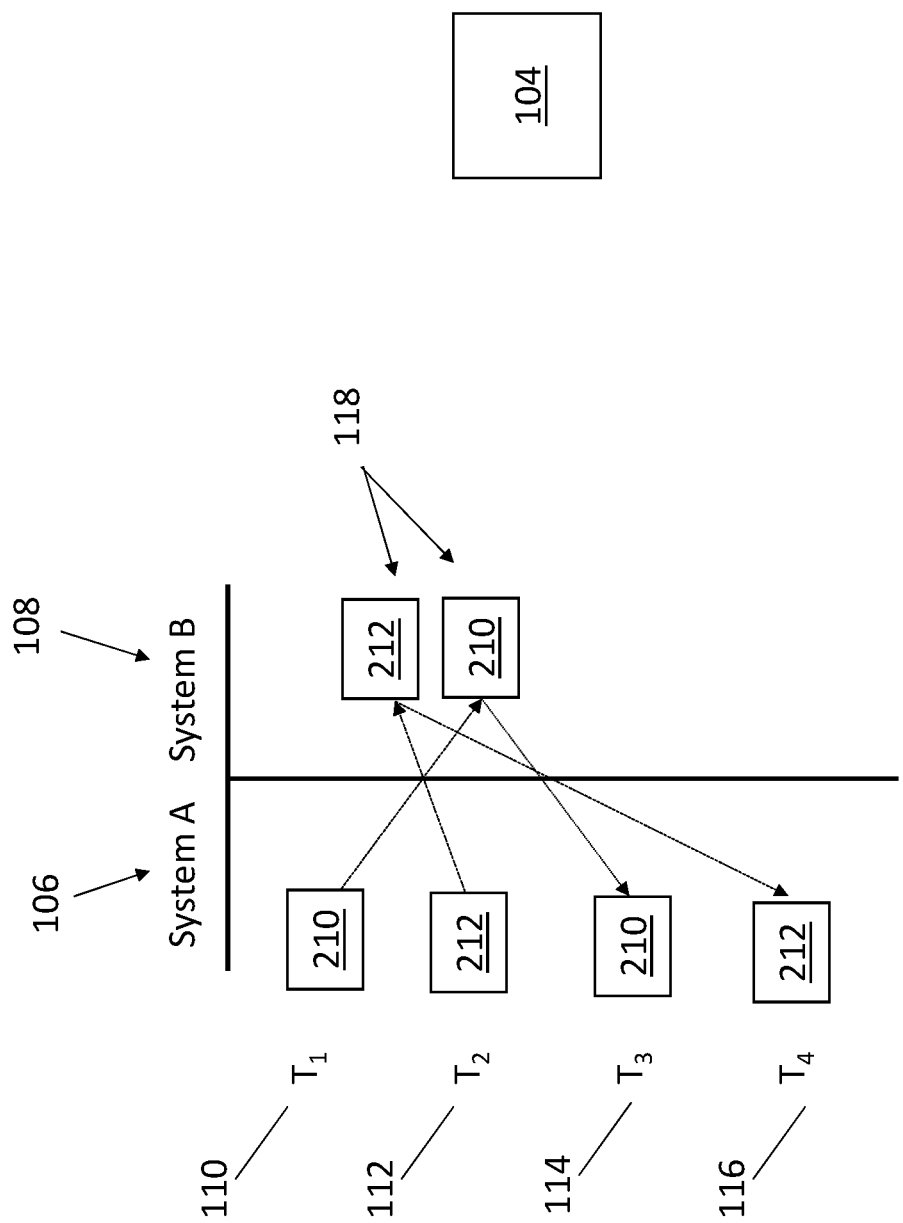
FIG. 1 is an exemplary visual representation of two exemplary datagrams sent between systems.
Figure 2:
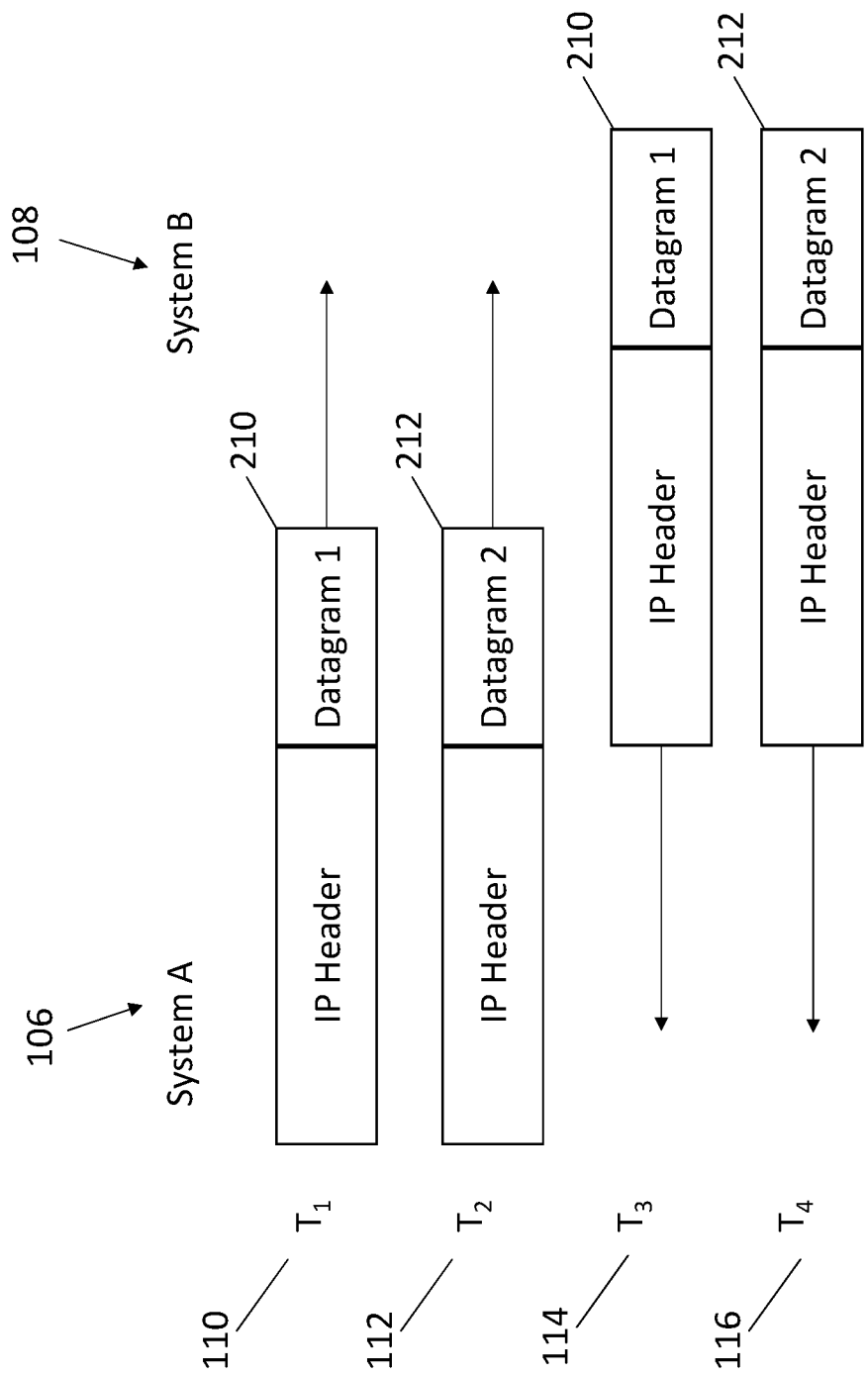
FIG. 2 is another exemplary visual representation of two exemplary datagrams being sent between two systems at certain times.
Figure 3:
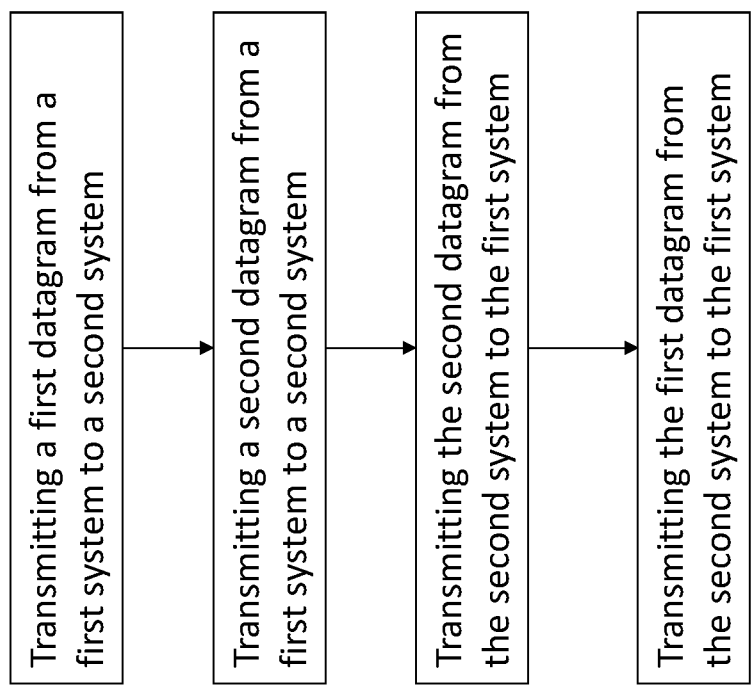
FIG. 3 is a simplified block diagram illustrating exemplary logic for use with the system of FIGS. 1 and 2.

Referring primarily to FIG. 1, FIG. 2, and FIG. 3, in order to isolate random error within an IP network, a first and second IP datagrams 210 and 212, respectively, may be transmitted from system A 106 to system B 108 and back again. The IP datagrams 210 and 212 may hereinafter also be referred to as "packets". The first and second IP datagrams 210 and 212 may be paired. The paired first and second IP datagrams 210 and 212 may hereinafter also be referred to collectively as a "couplet". The first and second IP datagrams 210 and 212 may be transmitted in a close sequence, and the order of their transmission may be reversed for the returning operation. In other exemplary embodiments, any number of IP datagrams 210 and 212 may be utilized. The IP datagrams may be coupled in groups of two, three, four, etcetera. Likewise, any number of systems 106 and 108 are contemplated, such that any number of such IP datagrams 210 and 212 may be sent between any number of systems 106 and 108.

Figure 4:
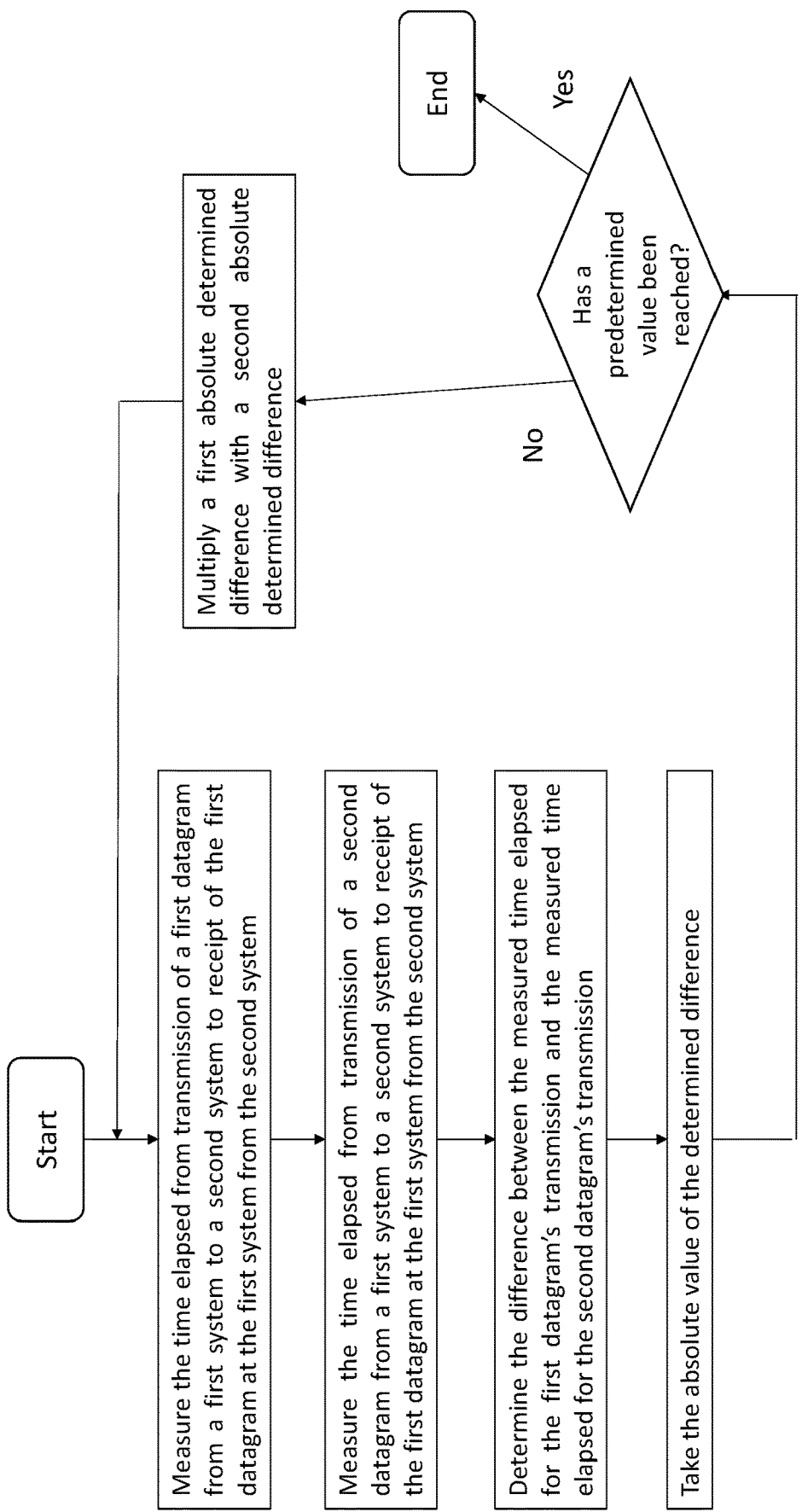
FIG. 4 is a simplified block diagram illustrating exemplary logic for use with the system and method of FIGS. 1-3.

Referring also to FIG. 4, $T_1$ 110, $T_2$ 112, $T_3$ 114, and $T_4$ 116 represent various points of time. The first IP datagram 210 may be transmitted from system A 106 to system B 108, and system B 108 may subsequently transmit the same packet 210 back to system A 106. The same operation may be performed on the second IP datagram 212. In the outgoing operation, the first and second IP datagrams 210 and 212 may be transmitted in close succession, with little to no interleaving additional transmissions. During the return operation, the sequence may remain close; however, the return packets may be reversed in sequence as generally indicated at item 118. In other words, the priority of their transmission may be reversed such that the second IP datagram 210 may be transmitted from system B 108 first and the first IP datagram 212 may be transmitted from system B 108 second. Once the operation has completed, the random error may be isolated with the following formula:

$$\text{Rnd}=\text{ABS}((T_3-T_1)-(T_4-T_2)) \qquad \text{Formula 1}$$

Rnd represents the random value returned. ABS represents taking the absolute value. $T_1$ represents the time at which the first IP datagram 210 is transmitted from system A 106. $T_2$ represents the time at which the second IP datagram 212 is transmitted from system A 106. $T_3$ represents the time at which the first IP datagram 210 is received at system A 106. $T_4$ represents the time at which the second IP datagram 212 is received at system A 106.

Since the packet couplet may traverse the network as a tight sequence, their performance will reflect a close approximation of the network transfer rate. Furthermore, the reverse of sequence for the return trip will eliminate any timing differences caused by network positioning. By measuring the time difference between the inbound and outbound operations, and correcting it by the difference between the first and second packets 210 and 212, the difference will be due to the result of random error. Random error may be considered to the physical, and unpredictable, behavior of the IP network. Formula 1 above describes how this random error may be calculated. The difference between $T_3$ 114 and $T_1$ 110 may reflect the time it takes to send the first IP datagram 210 back and forth from System A 106 to System B 108. The difference between $T_4$ 116 and $T_2$ 112 may reflect the timing of the second IP datagram 212. The difference between these two measurements is attributed to random error and may be a very small number, either positive or negative. The absolute function may be applied to the number to eliminate a signed result.

Magnification of Random Error

The result of formula 1 may be an extremely small value, and therefore, may require magnification before it becomes a generally usable number. To facilitate this magnification, an accumulated value may be used that is the result of multiplying multiple random events together. This operation may be placed in an accumulator, and subsequent observations may be multiplied with the accumulator until a desired numeric range has been achieved. As one skilled in the art will recognize, this operation may also occur from the addition of multiple random values or through various other mathematical operations.

$$Accum=Rnd_1 \times Rnd_2$$

$$\text{Loop: until Accum is in range } \{Accum=Rnd_x \times Accum\} \quad \text{Formula 2}$$

Accum represents the accumulated number. $Rnd_x$ represents a random number derived using formula 1. Loop may represent a repetition of the Accum operation a certain number of times. Stated another way, random values may be continually determined using formula 1 and multiplied, added, or the like, to the accumulated value until the accumulated value is greater than or equal to a predetermined amount.

While exemplary embodiments are described with respect to a first and second IP datagram 210 and 212, those skilled in the art will realize that any number of IP datagrams may be utilized. While exemplary embodiments are described with respect to system A 106 and system B 108, those skilled in the art will realize that any number of systems may be utilized. While exemplary embodiments are described with respect to multiplying, adding, or other mathematical operations of two random number outputs, it is contemplated that any number of random number outputs may be multiplied, added, some combination thereof, or the like.

Certain operations described herein may be performed by either or both of system A 106, system B 108, or a third system 104. Each of the systems 106, 108, or 104, may comprise one or more processors, electronic storage devices, executable software instructions, and the like configured to perform the operations described herein. The third system 104 may be in electronic communication with one or more of system A 106 and system B 108. Such communication may be by wired or wireless means.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method of generating a random number from a network comprising the steps of:
   performing a network operation comprising transferring a first and second datagram between a first and second computer system over the network;
   measuring the timing of the network operation within the network;
   comparing the network operation measurements to an expected timing;
   isolating a value for random error that occurs within the network, and
   returning the value for random error as the random number,
   wherein the measuring, comparing, isolating, and returning steps are performed by one of the first computer system, the second computer system, or a third computer system in electronic communication with one or more of the first computer system and the second computer system.

2. The method of claim 1, further comprising:
   magnifying the random error observed by multiplying the value with subsequent value observations.

3. The method of claim 1 wherein:
   the timing measured is a first time elapsed between transmitting the first datagram from the first computer system to the second computer system and receiving the first datagram back from the second computer system at the first computer system and a second time elapsed between transmitting the second datagram from the first computer system to the second computer system and receiving the second datagram back from the second computer system at the first computer system.

4. The method of claim 3 wherein:
   the first datagram is transmitted from the first computer system to the second computer system before the second datagram is transmitted from the first computer system to the second computer system; and
   the second datagram is transmitted from the second computer system to the first computer system before the first datagram is transmitted from the second computer system to the first computer system.

5. The method of claim 3 further comprising the steps of:
   determining the difference between the first elapsed time and the second elapsed time to arrive at a random timing difference.

6. The method of claim 5 further comprising the steps of:
   determining the absolute value of the random timing difference to arrive at an absolute random timing difference.

7. The method of claim 6 further comprising the steps of:
   measuring a third time elapsed between a second transmission of the first datagram from the first computer system to the second computer system and a second receipt of the first datagram back from the second computer system at the first computer system and a fourth time elapsed between a second transmission of the second datagram from the first computer system to the second computer system and a second receipt of the second datagram back from the second computer system at the first computer system.

8. The method of claim 7 further comprising the steps of:
   determining the difference between the third elapsed time and the fourth elapsed time to arrive at a retransmitted random timing difference.

9. The method of claim 8 further comprising the steps of:
   determining the absolute value of the retransmitted random timing difference to arrive at a retransmitted absolute retransmitted random timing difference.

10. The method of claim 9 further comprising the steps of:
    multiplying the absolute random timing difference with the absolute retransmitted random timing difference to arrive at an accumulated value.

11. The method of claim 10 further comprising the steps of:
    determining a number of additional absolute random timing differences and multiplying each additional absolute random timing difference with the accumulated value until the accumulated value is greater than or equal to a predetermined amount.

12. The method of claim 1 wherein: the network is an IP network.

13. A method of generating a random number from an IP network comprising the steps of:
transmitting, over the IP network, a first datagram from a first computer system to a second computer system;
transmitting, over the IP network, a second datagram from the first computer system to the second computer system;
transmitting, over the IP network, the first datagram from the second computer system to the first computer system;
transmitting, over the IP network, the second datagram from the second computer system to the first computer system;
measuring the time elapsed between transmission of the first datagram to the second computer system and receipt of the first datagram back at the first computer system as the first elapsed time;
measuring the time elapsed between transmission of the second datagram to the second computer system and receipt of the second datagram back at the first computer system as the second elapsed time; and
determining the difference between the first elapsed time and the second elapsed time to arrive at a random value;
wherein the measuring and determining steps are performed by one of the first computer system, the second computer system, or a third computer system in electronic communication with one or more of the first computer system and the second computer system.

14. The method of claim 13 further comprising the steps of:
determining the absolute value of the random value to arrive at an absolute random value.

15. The method of claim 13 wherein:
the first datagram is transmitted from the first computer system to the second computer system before the second datagram is transmitted from the first computer system to the second computer system; and
the second datagram is transmitted from the second computer system to the first computer system before the first datagram is transmitted from the second computer system to the first computer system.

16. The method of claim 13 further comprising the steps of:
determining an accumulated value by multiplying the random value with a second random value.

17. The method of claim 13 further comprising the steps of:
determining an accumulated value by adding the random value with a second random value.

18. A system for generating a random number from an IP network comprising the steps of:
a first system connected to the IP network and comprising executable software instructions, which when executed configure the first system to:
transmit a first datagram from the first system to a second system connected to the IP network, and
after transmitting the first datagram, transmit a second datagram from the first system to the second system; and
the second system comprising executable software instructions, which when executed configure the second system to:
transmit the second datagram from the second system to the first system, and
after transmitting the second datagram, transmit the first datagram from the second system to the first system; and
a third system in electronic communication with the first system and the second system and comprising executable software instructions, which when executed configure the third system to:
measure the time elapsed between transmission of the first datagram to the second system and receipt of the first datagram at the first system as the first elapsed time,
measure the time elapsed between transmission of the second datagram to the second system and receipt of the second datagram at the first system as the second elapsed time, and
determine the difference between the first elapsed time and the second elapsed time to arrive at a random value.

19. The system of claim 18 wherein:
the third system comprises additional software instructions, which when executed configure the third system to:
determine the absolute value of the random value to arrive at an absolute random value, and
determine an accumulated value by multiplying the absolute random value with a second random value.

* * * * *